Dec. 4, 1923.

I. COHEN

PROJECTION LAMP

Filed Feb. 2, 1922

1,476,149

Inventor
I. Cohen
By J. R. Bryant
Attorney

Patented Dec. 4, 1923.

1,476,149

UNITED STATES PATENT OFFICE.

ISADORE COHEN, OF ELIZABETH, NEW JERSEY.

PROJECTION LAMP.

Application filed February 2, 1922. Serial No. 533,621.

*To all whom it may concern:*

Be it known that I, ISADORE COHEN, a citizen of the United States of America, residing at Elizabeth, in the county of Union and State of New Jersey, have invented certain new and useful Improvements in Projection Lamps, of which the following is a specification.

This invention relates to certain new and useful improvements in projection lamps, particularly adapted for use upon motor vehicles as headlights.

The primary object of the invention is to provide a projection lamp of the above kind which will produce a brilliant beam of light having an even field as well as being entirely devoid of glare.

Another object of the invention is to utilize and control as much of the source of light as possible, and to spread the emergent beam over as wide a road surface as possible so that practical illumination of the roadway may be had.

Briefly described, the invention consists in a housing provided with an opening, a reflecting surface disposed within the housing behind said opening, a condensing lens arranged within the housing below said opening and reflecting surface, and a source of light below said lens adapted to supply rays of light to the lens which may all be converged and thereby made parallel by means of the condensing lens which is arranged at its focal distance from said source of light. The invention also contemplates the formation of the reflecting surface of convex or concave cylindrical form whereby the beam of light from said reflecting surface and which passes through said opening is spread in a horizontal direction for illuminating a wide area of the road.

Another object of the invention is to mount the reflecting surface for vertical swinging movement so as to project the beam of light onto the roadway at a predetermined or desired distance ahead of the lamp.

With the above general objects in view and others that will appear as the nature of the invention is better understood, the same consists of the novel form, combination and arrangement of parts hereinafter more fully described, shown in the accompanying drawing and claimed.

Figure 1:
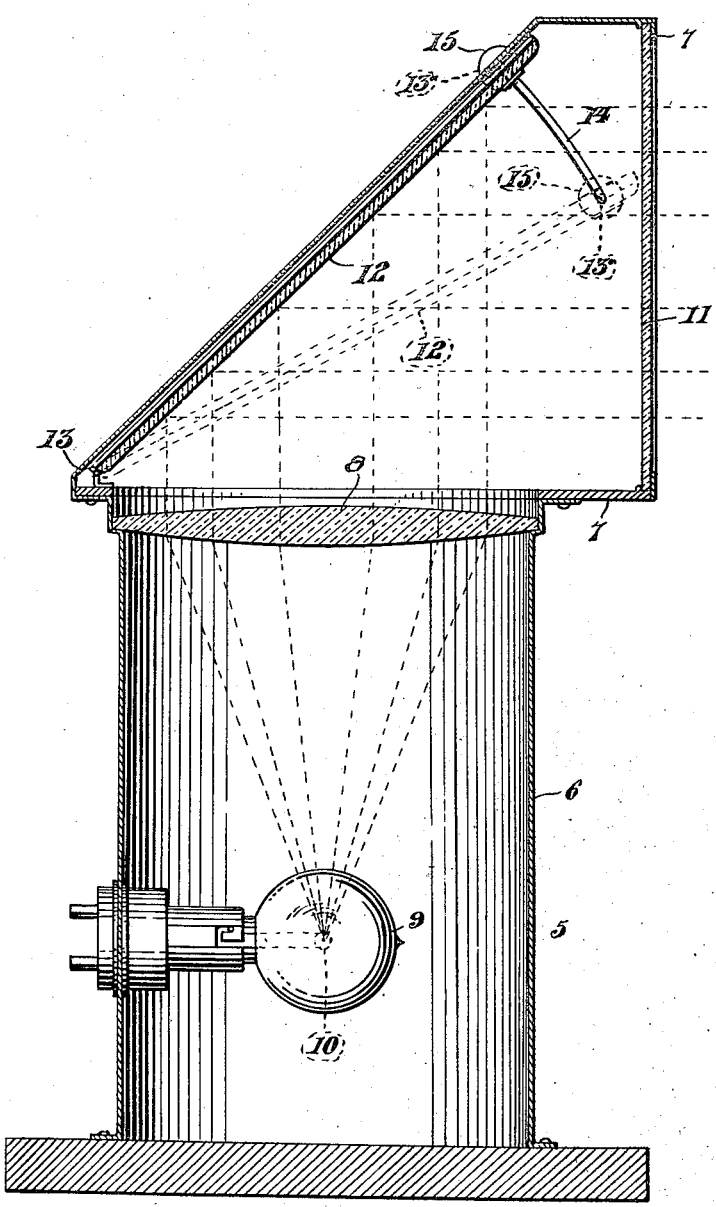
Figure 2:
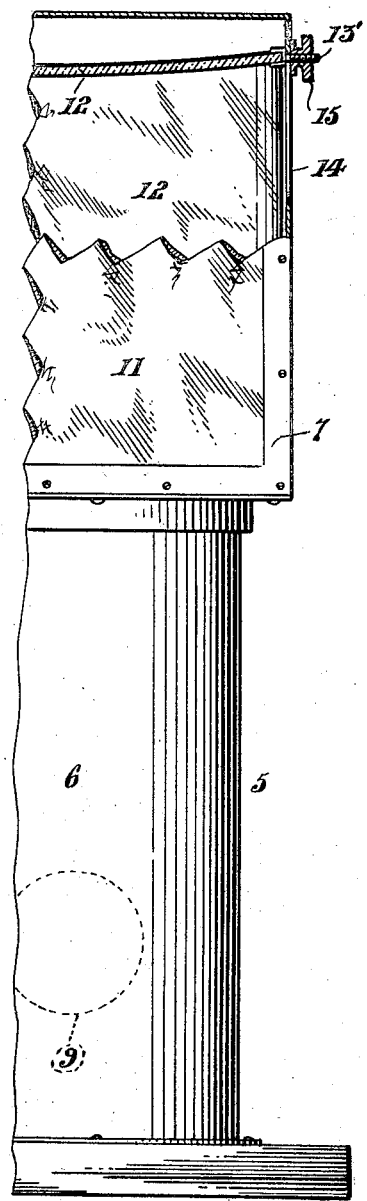

In the drawing, wherein like reference characters designate corresponding parts throughout the several views, Figure 1 is a substantially central vertical sectional view of a projection lamp constructed in accordance with the present invention and with the reflecting surface shown adjusted by dotted lines, and Figure 2 is a fragmentary view partly in front elevation and partly in vertical section of the device shown in Fig. 1.

Referring more in detail to the several views, 5 indicates a housing which may be of any desired form, the same being herein shown as consisting of a cylindrical lower portion and an angular upper portion respectively indicated by the numerals 6 and 7. A condensing lens, preferably of the double convex type and indicated at 8 is suitably supported and retained in the upper end portion of the lower portion 6 of the casing, and a source of light 9, preferably an ordinary incandescent electric light bulb, is disposed beneath the lens 8 within the housing so that the lens 8 is at its focal distance from the luminous portion 10 of the lamp filament.

The portion 7 of the housing is provided with an opening in one side thereof which may be closed by an ordinary plain sheet of glass as at 11, and a reflecting surface 12 is disposed within the housing behind said opening, said reflecting surface 12 being of convex or concave cylindrical form with the axis of its curvature such that the beam will be spread horizontally as will be apparent. As shown clearly in Fig. 1, the condensing lens 8 is disposed beneath the opening having the glass closure 11, and below the reflecting surface 12 so that the rays of light which emanate from the source 10 will pass divergingly to the lens 8 and will then be converged to parallel rays which strike the reflecting surface 12 and are then projected outwardly through the glass closure 11.

The reflecting surface 12 is made adjustable so as to provide for the projection of the rays through the closure 11 at an angle of 45° or less so that the rays will pass either horizontally or at a downward inclination for illuminating the roadway at the desired distance ahead of the lamp.

In order to provide for this adjustment of the reflecting surface 12, the latter is preferably hingedly mounted upon a horizontal axis at its lower edge as at 13 and adjustably connected by means of bolts 13' which pass through arcuate slots 14 and have thumb nuts 15 threaded thereon, to the housing. This mode of adjustment of the reflecting surface 12 is merely an example of one means which may be employed for the purpose and it is accordingly to be understood that the specific adjustment shown and described may be varied at will without departing from the spirit and scope of the invention.

By reason of the fact that the reflecting surface 12 is not adjustable to a greater angle than 45°, upward rays are prevented and consequently a glaring light cannot be obtained, this being especially true in view of the fact that said reflecting surface 12 is curved in only one direction for spreading the light horizontally, but not vertically. The light produced by the present device consists in the projected highly luminous field produced by the rays of light entering and passing through the condensing lens 8 which is arranged at its focal distance from the means for producing the divergent rays of light, or the source of light.

While condensing lenses have been used in lamps of this character they have been used in other relations than at their focal distances from the source of light or their quality has been destroyed by the additional use of parabolic reflectors behind the source of light. Also, although convex mirrors or reflecting surfaces have been used as at 12 in the present invention, such prior reflecting surfaces have been convexed in more than one direction so that their use would produce glare and so that they are accordingly objectionable in the headlight art.

This objection is overcome by the use of mirrors convexed in only one direction so as to simply produce a horizontal and no vertical spread of light.

From the foregoing description it is believed that the construction and operation as well as the advantages of the present invention will be readily understood and appreciated by those skilled in the art.

Minor changes may be made in the invention without departing from the spirit and scope thereof as claimed.

What is claimed as new is:—

1. In a projection lamp of the class described, a housing provided with an opening, a condensing lens arranged within the housing below said opening, a source of light within the housing below said lens, an inclined reflector horizontally hingingly connected to said housing laterally of and above the outer edge of said lens to project light through said opening, a wall of said housing constituting a stop for the adjusting movement of said reflector to prevent the reflection of light rays above a horizontal line.

2. In a projection lamp of the class described a housing provided with an opening, the wall of said housing opposite said opening being inclined at 45°, a condensing lens arranged within the housing below said opening, a source of light within the housing below said lens, and a reflector horizontally hingingly connected to said casing laterally of and above the outer edge of said lens, the said mentioned wall of said housing constituting a stop for the upward adjusting movement of said reflector to prevent the reflection of light rays above a horizontal line.

In testimony whereof I affix my signature.

ISADORE COHEN.